March 12, 1957 T. W. CLARK 2,784,538
ATTACHMENT FOR MACHINE TOOLS
Filed June 28, 1954 4 Sheets-Sheet 1
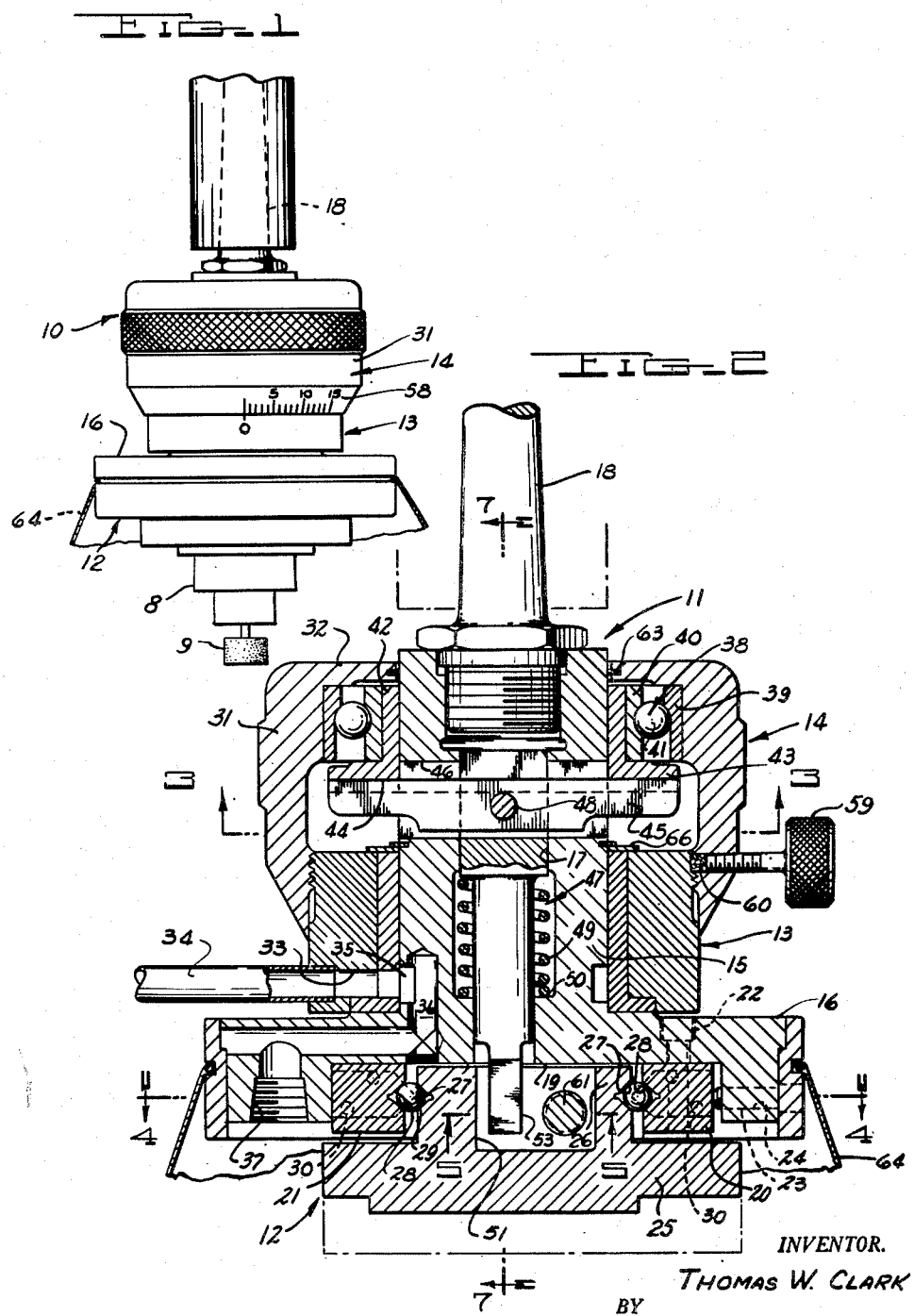
INVENTOR.
Thomas W. Clark
BY
Whittemore, Hulbert & Belknap
ATTORNEYS March 12, 1957 T. W. CLARK 2,784,538
ATTACHMENT FOR MACHINE TOOLS
Filed June 28, 1954 4 Sheets-Sheet 2
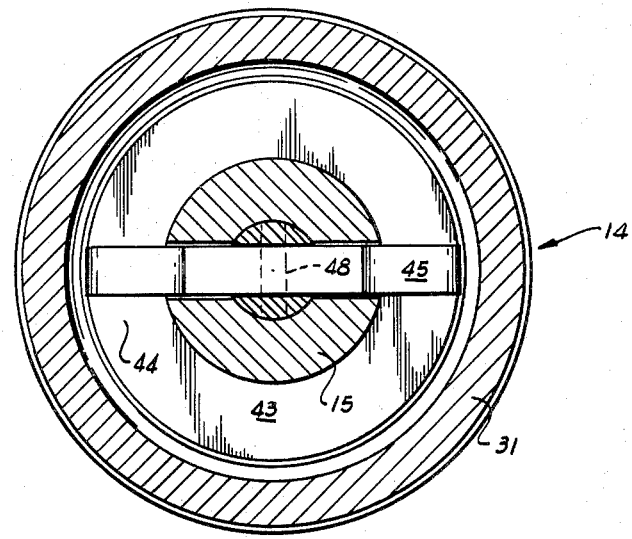
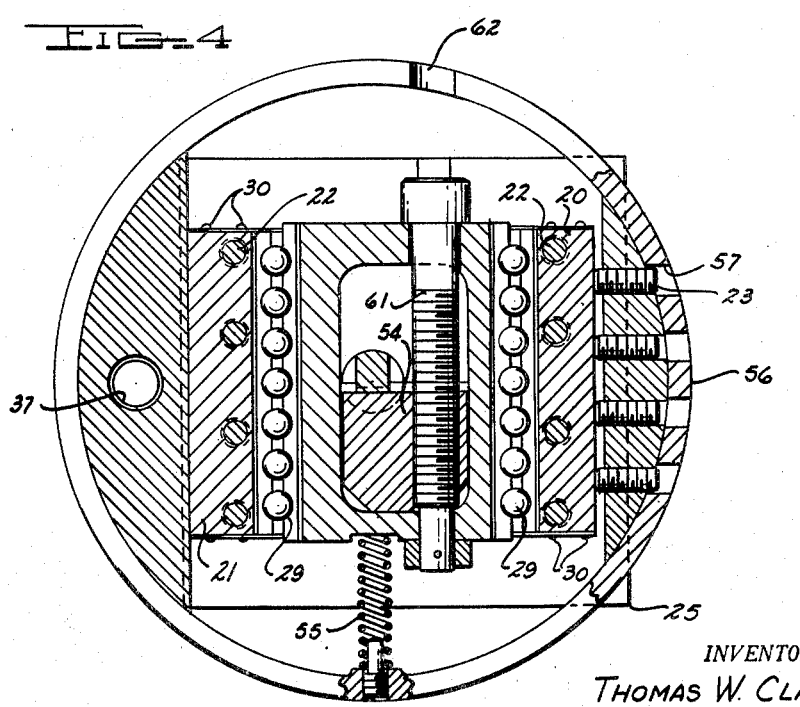
INVENTOR.
THOMAS W. CLARK
BY
ATTORNEYS

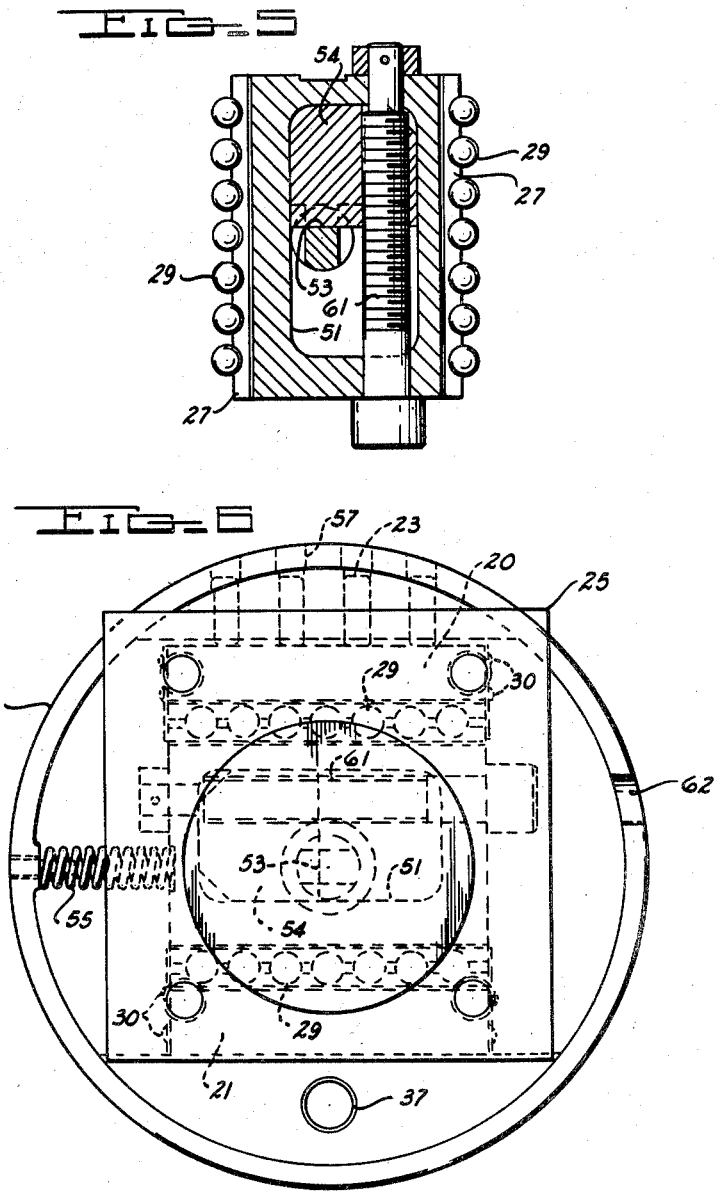

March 12, 1957 T. W. CLARK 2,784,538
ATTACHMENT FOR MACHINE TOOLS
Filed June 28, 1954 4 Sheets-Sheet 4
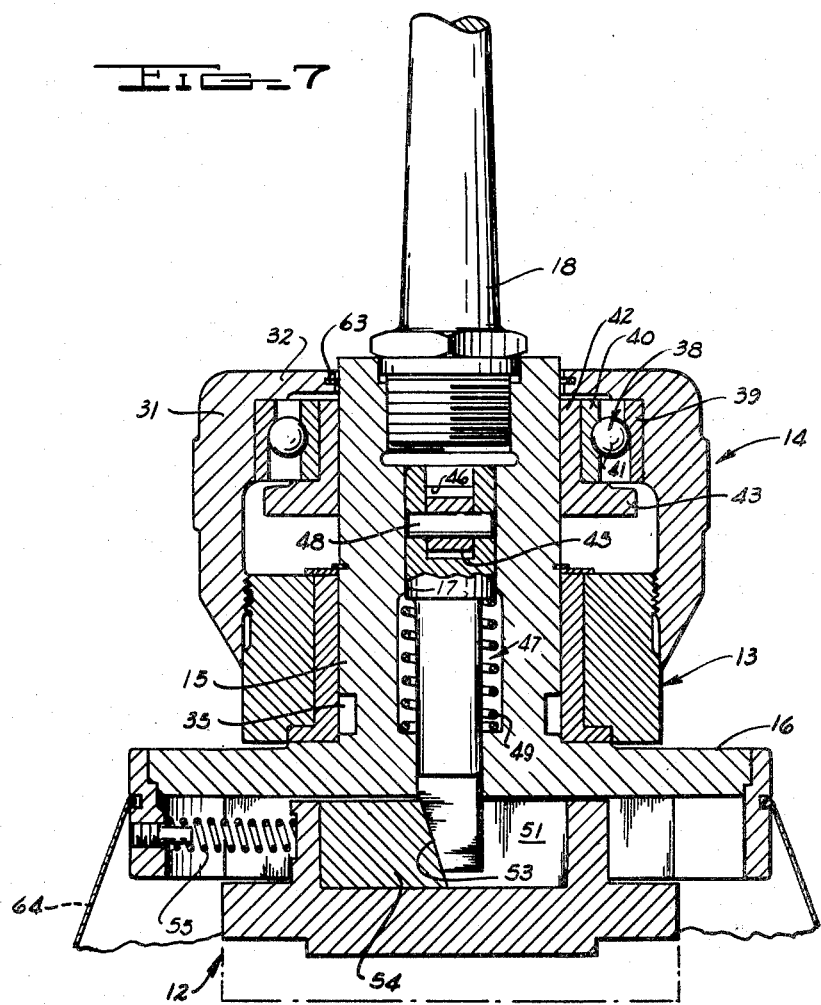
INVENTOR.
THOMAS W. CLARK
BY
ATTORNEYS

United States Patent Office 2,784,538
Patented Mar. 12, 1957

2,784,538

ATTACHMENT FOR MACHINE TOOLS

Thomas W. Clark, Grosse Pointe, Mich., assignor to Perfex Gage and Tool Company, Mount Clemens, Mich., a corporation of Delaware Application June 28, 1954, Serial No. 439,543

9 Claims. (Cl. 51—245)

This invention relates generally to attachments for machine tools and refers more particularly to improvements in tool carrying heads attachable to the drive spindle of machine tools such, for example, as jig grinders.

It is an object of this invention to provide a tool carrying head having means rendering it possible to adjust the tool relative to a work piece during operation of the tool by the head. In other words, with the present invention it is not necessary to stop the machine in order to change the position of the tool relative to a work piece and, hence, a higher rate of production may be maintained with less effort on the part of the operator.

It is another object of this invention to provide a head of the above general type composed of a relatively few simple parts capable of being inexpensively manufactured and assembled.

The foregoing as well as other objects will be made more apparent as this description proceeds especially when considered in connection with the accompanying drawings, wherein:

Figure 1 is a side elevational view of a tool carrying head embodying the features of this invention;

Figure 2 is a longitudinal sectional view through the head shown in Figure 1;

Figures 3, 4 and 5 are respectively sectional views taken on the lines 3—3, 4—4 and 5—5 of Figure 2;

Figure 6 is a bottom elevational view of the head shown in Figure 1; and

Figure 7 is a sectional view taken on the line 7—7 of Figure 2.

The tool carrying head forming the subject matter of this invention is indicated in the drawings by the numeral 10 and is attachable to practically any spindle type of machine wherein it is necessary or desirable to adjust the operating position of a tool with reference to a work piece. The head 10 comprises a body 11, an adaptor 12, to which a suitable tool, such as an air motor 8 and grinding element 9 is attachable, a ring 13, and a collar 14.

The body 11 has a cylindrical shank part 15 and a cylindrical base 16 of a diameter substantially greater than the diameter of the shank part 15. Extending axially through the body 11 is a bore 17 having an enlarged threaded portion at the upper end for threadably engaging the lower end of a machine tool driving spindle 18 connected at the upper end to suitable power means, not shown.

The base 16 of the body 15 is fashioned with a downwardly opening recess 19 having rectilinear walls at opposite sides of the axis of the body 11 and adapted to receive a pair of elongated blocks 20 and 21. The blocks respectively extend along the rectilinear walls of the recess 19 and are secured to the body 15 by studs 22. The studs 22 for securing the block 20 to the body 11 have a loose fit in bores formed in the base 16 of the body rendering it possible to adjust the block 20 relative to the block 21 in directions toward and away from the latter. For accomplishing this result, adjusting screws 23 are threadably mounted in bores 24 extending through the side wall of the base 16 adjacent the block 20 in a manner to engage the outer side of the block 20. The bores 24 are spaced from one another lengthwise of the block 20 and the adjusting screws 23 in the bores 24 are accessible for manipulation from one side of the head 10. The purpose of the adjustable mounting for the block 20 will become apparent as this description proceeds.

The adaptor 12 has a rectangular plate-like portion 25 located beneath the recess 19 in the base 16 of the body 11 and has an upwardly extending reduced portion 26. The reduced portion 26 is also rectangular in shape and is positioned within the recess 19 between the blocks 20 and 21. The opposite side walls of the reduced portion 26 are fashioned with V-shaped grooves 27 which extend for the full length of these walls and register with the V-shaped grooves 28 formed in the adjacent inner walls of the blocks 20, 21.

The registering grooves aforesaid cooperate to retain a series of balls 29 in place between the blocks 20, 21 and the adjacent walls of the reduced portion 26. The balls 29 provide antifriction means for slidably supporting the adaptor 12 on the base 16 of the body 11 and are held in place by suitable plates 30. The plates 30 are respectively secured to opposite ends of the blocks 20, 21 and have portions which project inwardly with respect to the blocks to provide the grooves 28 in the blocks with end walls. Thus, displacement of the balls 29 are prevented by the plates 30 in the assembled position of the various parts of the head 10.

With the construction described above, it will be noted that the tool carrying adaptor 12 is supported on the base 16 of the body 11 for sliding movement relative to the body in a plane perpendicular to the axis of rotation of the body. The purpose of this movement of the adaptor 12 relative to the body 11 is to predetermindely locate a tool carried by the adaptor with reference to the work being performed by the tool. Although the adaptor 12 is slidable relative to the body 11, it will be noted that the adjustment provided by the screws 23 assures firmly holding the adaptor 12 against lateral displacement in any one of its various adjusted positions.

The collar 14 has an annular wall 31 concentric with respect to the axis of the body 11 and has a top wall 32 centrally apertured to receive the upper end of the shank 15 on the body 11. The lower end of the annular wall 31 is internally threaded and is threadably mounted on the outer ring 13 which is also positioned in concentric relationship to the shank 15 of the body 11 and held against axial movement relative to body 11 by a snap-ring held washer 66. In the present instance, the ring 13 is fixed against rotation with the body 11 by a conduit 34 and a passage 33 extends through the ring. The outer end of the passage 33 is connected to a conduit 34 which in turn is connected to a source of air under pressure and the inner end of the passage 33 communicates with an annular groove 35 formed in the shank 15 of the body 11 adjacent the base 16. The groove 35 is connected to a passage 36 formed in the body and having an outlet 37 adapted for connection to a tool operating air motor, such as motor 8.

Inasmuch as the ring 13 is fixed against rotation with the body 11 by the conduit 34 in the illustrated embodiment and since the collar 14 is threadably mounted on the ring 13, it follows that the collar is also held against rotation with the body 11. However, the collar 14 is rotatable relative to the ring 13 and due to the threaded connection therebetween is movable axially relative to the body 11. As shown in Figure 2 of the drawings, the collar 14 is also rotatably supported by a ball bearing 38 comprising an outer race 39, an inner race 40 and a series of balls 41 interposed between the races.

3

The outer race 39 is secured to the collar 14 for rotation as a unit with the latter and the inner race 40 is secured to a bearing 42 mounted on the shank 15 of the body 11. The bearing 40 has a radially outwardly extending flange 43 at the lower end thereof and this flange is provided with diametrically opposed radially outwardly extending slots 44 for respectively receiving the opposite ends of a driver 45.

The driver 45 is in the form of a bar which extends at right angles to the axis of rotation of the body 11 through a slot 46 formed in the shank 15 and intersecting the bore 17. The depth of the slot 46 is greater than the thickness of the bar 45 by an amount predetermined to provide the required axial movement of the collar 14 relative to the body 11. The driver 45 is operatively connected to a plunger 47 which is slidably supported in the bore 17 and is bifurcated at the upper end to receive the driver 45, as shown in Figure 7 of the drawings. The furcations at the upper end of the plunger 47 are secured to the driver 45 to hold the latter in assembled relationship by a pin 48. The lower end of the plunger is reduced and the bore 17 is enlarged somewhat to accommodate a spring 49 having the lower end seated on a shoulder 50 formed by the enlarged portion of the bore 17 and having the upper end abutting the plunger 47 to urge the latter together with the driver and bearing 42 upwardly.

As shown in Figure 7 of the drawings, the lower end of the plunger 47 projects into a recess 51 formed in the reduced portion 26 of the adaptor 12 and has a tapered cam surface 52 engageable with a correspondingly tapered surface 53 formed on a nut 54. The cam surfaces extend at right angles to the path of sliding movement of the adaptor 12 and the wall of the nut 54 opposite the cam surface 53 abuts the adjacent wall of the recess 51 so that downward movement of the plunger 47 imparts a sliding movement to the adaptor 12 in a radially outward direction. The cam surfaces are urged into contact with one another by a spring 55 supported within a bore formed in the base 16 with the inner end abutting the adjacent end wall of the reduced portion 26 and with the outer end abutting a ring 56. The ring 56 encircles the base 16 and is provided with openings 57 respectively registering with the bores 24 to provide access to the adjusting screws 23.

With the above construction, it will be noted that rotation of the collar 14 relative to the ring 13 in a direction to feed the collar 14 toward the base 16 of the body 11 imparts a corresponding movement to the ball bearing 38. Inasmuch as the inner race 40 of the ball bearing abuts the flange 43 on the bearing 40, it follows that the driver 45 together with the plunger 47 is moved downwardly relative to the body 11 against the action of the spring 49. Downward movement of the plunger 47 shifts the nut 54 together with the adaptor 12 in a radially outward direction against the action of the spring 55. On the other hand, rotation of the collar 14 in the opposite direction enables the spring 49 to move the plunger upwardly or in a direction away from the base 16 and permits the spring 55 to move the adaptor 12 radially inwardly.

Suitable graduations 58 are provided on the collar 14 in a position to selectively register with a corresponding indicator on the sleeve 13 to enable moving the adaptor 12 predetermined distances. Also the collar 14 may be locked in any one of a number of adjusted positions by a thumb screw 59 threadably mounted in the collar 14 and engageable with a friction element 60 to urge the latter into frictional engagement with the stationary ring 13.

In accordance with the present invention, a preliminary or rapid adjustment of the adaptor 12 is accomplished by a screw 61 journalled on the reduced portion 26 of the adaptor 12 and threadably engaging the nut 54. As shown in Figures 5 and 6 of the drawings, the screw 61 cooperates with the spring 55 to move the adaptor 12 inwardly and outwardly independently of the collar 14. This preliminary adjustment is accomplished by stopping of the rotation of the head 10 and insertion of a tool through a clearance opening 62 formed in the ring 56 on the base 16 of the body 11. However, the micrometer adjustment of the adaptor 12 effected by the collar 14 may be accomplished while the head 10 is being rotated by the drive spindle 13. This is desirable in that it renders it possible to locate the tool relative to the work being performed without stopping rotation of the head and, hence, the production rendered possible by the head is greatly increased.

The interior of the head is thoroughly protected from the entrance of foreign matter by a seal 63 carried by the collar 14 at the top of the latter in a position to engage the adjacent surface of the rotating body 11. Also, a flexible boot or cover 64 is attached to the ring 56 and to the tool holder (not shown) to prevent foreign matter from escaping upwardly into the head.

What I claim as my invention is:

1. A tool head adapted for quick connection to a driving spindle of a machine tool whereby said head is entirely supported by the spindle and driven thereby comprising a unitary structure having a rotatable body attachable to a machine tool spindle coaxially therewith and driven thereby, a ring adapted to be held against rotation carried by the body and relatively rotatable thereon, guideways on the body transverse thereof, a carrier operably guided in the guideways and adapted to support a tool driving air motor, said body and ring having cooperating air supply passages in continuous communication during relative rotation thereof for supplying air to the air motor, an air supply conduit extending from the non-rotating ring, a member adjustable on said ring, and means responsive to adjustment of said member on said ring for moving the carrier along the guideways to adjust the radial location of the air motor with respect to the axis of rotation of the body.

2. A tool head adapted for quick connection as a unit to a driving spindle of a machine tool whereby said head is entirely supported by the spindle and driven thereby comprising a body, a shank attached to one end of said body for detachable coupling to a machine tool spindle for entirely supporting the unitary head and rotatably driving the body, guideways at the other end of said body, a carrier for mounting a tool driving air motor, said carrier being supported in said guideways for rotation as a unit with said body and for movement along said guideways in directions toward and from the axis of rotation of said head, a member adapted to be held against rotation carried coaxially by said body for relative rotation thereon and fixed against axial movement relative to the body, cooperating air supply passages in said member and said body in continuous communication during relative rotation therebetween, a conduit connected to the member passage for supplying air thereto, the body passage being provided for connection to the air motor, a collar supported by said member for adjustment relative to the member to different axial positions along the axis of the body, and means responsive to adjustment of the collar on the member for moving the carrier in directions toward and away from the axis of rotation of the head to vary the eccentricity of the air motor relative to the axis of rotation of the machine spindle.

3. A tool head for quick connection as a unit to a driving spindle of a machine tool whereby said head is entirely supported by the spindle and driven thereby comprising a body, means at one end of said body for ready attachment of the body coaxially to a machine tool spindle for entirely supporting the unitary head and rotatably driving the body, guideways on said body, a carrier for mounting a tool driving air motor, said carrier being supported in said guideways for rotation as a unit with said body and for movement along said guideways in directions toward and from the axis of rotation of said head, a threaded member adapted to be held against rotation journaled coaxially about said body for relative rotation thereon, means fixing said member against axial movement on the body, cooperating air supply passages in said member and said body including an annular groove in one of the cooperating mating surfaces providing continuous communication during relative rotation therebetween, a conduit connected to the member passage for supplying air thereto and preventing rotation of the member as the body is driven, the body passage being provided for connection to the air motor, a collar threaded on said member for adjustable rotation and movement relative to the body along the axis thereof, and means responsive to adjustment of the collar in opposite directions relative to the member for respectively moving the carrier in directions toward and away from the axis of rotation of the body.

4. A tool head for quick connection as a unit to a driving spindle of a machine tool comprising a body, a shank at one end of said body for ready coupling to a machine tool spindle for entirely supporting the unitary head and rotatably driving the body, guideways at the other end of said body, a carrier for mounting a tool driving air motor, said carrier being supported in said guideways for rotation as a unit with said body and for movement along said guideways in directions toward and from the axis of rotation of said head, a plunger rotatable with the body and carried therein for sliding movement along the axis of rotation of the body, cooperating actuating means on the plunger and carrier for moving said carrier along said guideways and relative to said body in response to axial movement of the plunger within the body, a ring adapted to be held against rotation carried coaxially by said body for relative rotation thereon, means fixing said ring against axial movement relative to the body, cooperating air supply passages in said ring and said body in continuous communication during relative rotation therebetween conduit means connected to the passages for supplying air thereto, the body passage being provided for connection to the air motor, a part supported by said ring for adjustable movement relative thereto along the axis of rotation of the body, and means operatively connecting said part to said plunger for adjustable movements of the plunger for moving the carrier in directions toward and away from the axis of rotation of the body as desired.

5. The structure defined in claim 4 wherein the cooperating actuating means comprises means providing a tapered cam surface in said carrier inclined relative to the axis of rotation of said body, and a similarly tapered cam surface at one end of the plunger engageable with the cam surface of the carrier for movement of the carrier along the guideways upon axial reciprocation of the plunger.

6. The structure defined in claim 4 wherein said member is in the form of a ring journaled about said body in concentric relation to the axis of rotation of the body and wherein said part comprises a collar threaded on the ring.

7. The structure defined in claim 4 wherein the cooperating means comprises a nut secured to the carrier and having a tapered cam surface, and a tapered cam surface on the plunger directly engageable with the cam surface on the nut.

8. The structure defined in claim 7 further comprising an adjusting screw securing the nut to the carrier and operable independently of said part for sliding the carrier relative to the body.

9. The structure defined in claim 4 further comprising an air motor supported on said carrier, and a grinding tool driven thereby.

References Cited in the file of this patent

UNITED STATES PATENTS

| | | |
|---|---|---|
| 1,923,390 | Parkhurst | Aug. 22, 1933 |
| 1,962,951 | Conwell | June 12, 1934 |
| 1,995,027 | Glassford | Mar. 19, 1935 |
| 2,151,251 | Weidner | Mar. 21, 1939 |
| 2,458,765 | Bryant | Jan. 11, 1949 |
| 2,559,180 | Victory | July 3, 1951 |
| 2,608,807 | Nilsen | Sept. 2, 1952 |
| 2,692,461 | Hartzell | Oct. 26, 1954 |